March 29, 1932.　　　L. LÖWENSTEIN　　　1,851,961
PRODUCING HYDROGEN PEROXIDE
Filed Jan. 18, 1927
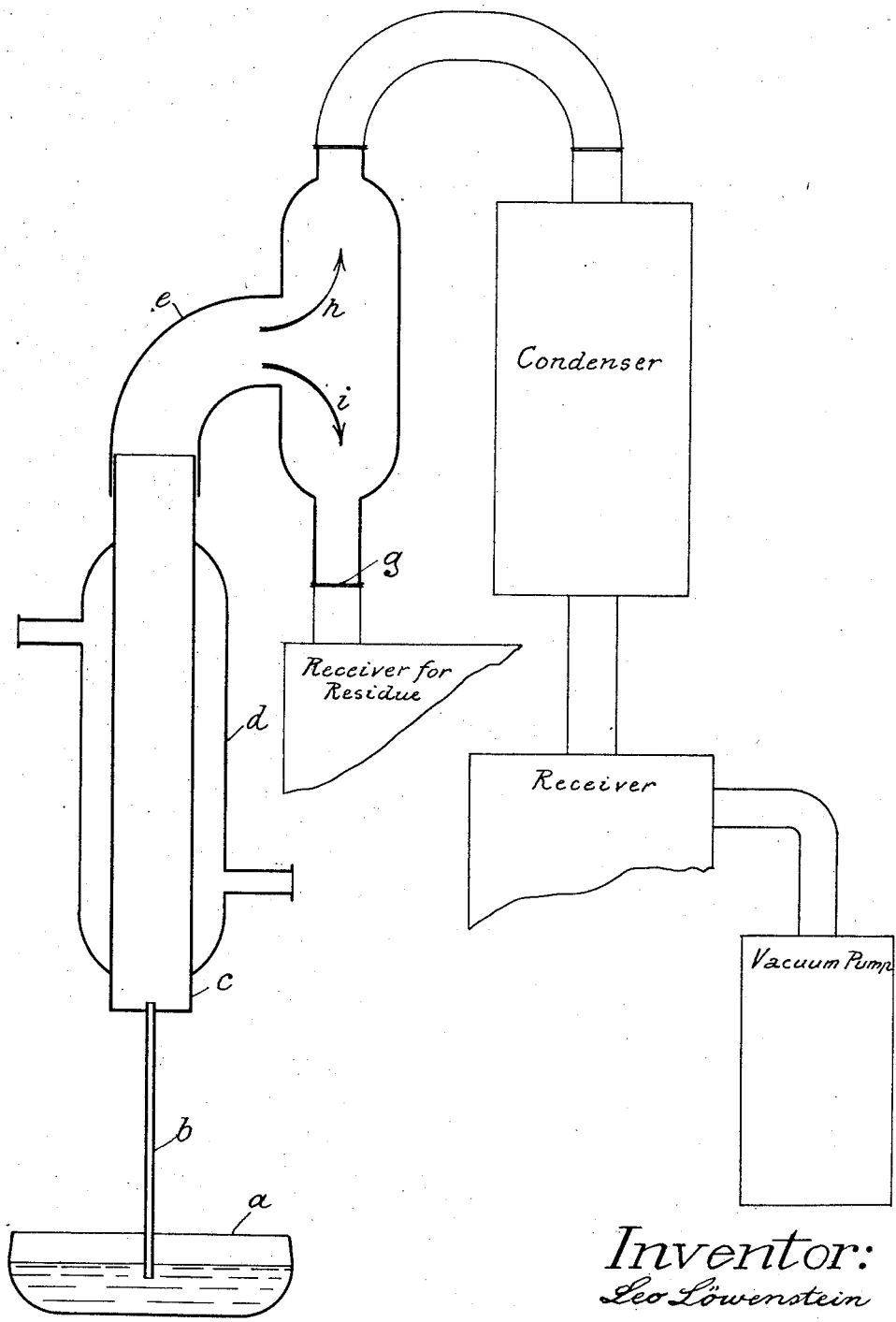
Inventor:
Leo Löwenstein
by
Paul Fischland
Attorney Patented Mar. 29, 1932

1,851,961

UNITED STATES PATENT OFFICE

LEO LÖWENSTEIN, OF BERLIN-LICHTERFELDE, GERMANY, ASSIGNOR TO FIRM J. D. RIEDEL AKTIENGESELLSCHAFT, OF BERLIN-BRITZ, GERMANY

PRODUCING HYDROGEN PEROXIDE

Application filed January 18, 1927, Serial No. 161,787, and in Germany June 2, 1922.

This invention relates to the production of hydrogen peroxide, more especially from persulfates. All the methods hitherto known start from solid persulfates, no method being hitherto known for obtaining hydrogen peroxide from aqueous solutions of persulfates in a practical way. This may be due to the fact that during the distillation crystalline masses are deposited upon several parts of the distilling apparatus whereby the output may be lessened.

Now I have found that the above-mentioned difficulties do not arise if sulfuric acid is added to the persulfate solutions in excess over the calculated amount preferably, for instance 1.3 molecules of sulfuric acid per one molecule of persulfate. Furthermore, if the solution contains sulfates besides the persulfate, which is, for instance, the case when solutions produced from sulfates by electrolysis are employed, a further amount of sulfuric acid must be added so as to produce acid sulfates. A further addition of sulfuric acid may be necessitated by the particular kind of the distilling vessel. Moreover, in some cases, previous dilution with water is advisable. When operating in the described manner, the solution remains liquid up to the end of the distillation, and thus the problem of producing hydrogen peroxide from persulfate solutions with a satisfactory output is now solved.

By further developing the above ideas I have found a method for obtaining hydrogen peroxide in a cyclic process. Firstly when electrolyzing the sulfates the quantities of the sulfuric acid contained in the anode and cathode chambers and the time of their staying therein is regulated in such a manner that the solution leaving the anode chamber contains more than one molecule of sulfuric acid per each molecule of persulfate and sulfate. Now the anodic solution is subjected to distillation; the residue from this distillation, after dilution with water, is introduced into the cathode and finally again into the anode chamber. The time of stay in both chambers is to be calculated in such a manner that the solution leaving the anode chamber corresponds to the just mentioned conditions. Now the anodic solution is subjected to distillation, and so forth. By letting the solution flow continuously and uniformly through cathode chamber, anode chamber and distilling apparatus an extensive cyclic process involving no practically important loss of material may be carried through. If, for instance, after distillation a solution containing 1.25 moles of ammonium sulfate and 2.9 moles of sulfuric acid per liter flows to the cathode chamber, good results are obtained by leaving this solution in the cathode chamber, until it contains 1.5 moles of ammonium sulfate and 2.1 moles of sulfuric acid per liter, and finally distilling the solution introduced into the anode chamber as soon as it has been brought therein to a concentration of 1.1 moles of ammonium persulfate, 0.15 moles of ammonium sulfate, and 1.8 moles of sulfuric acid per liter.

For better comprehension I have illustrated a distilling apparatus adapted for carrying out my invention by way of example in the annexed drawing.

Of course, in carrying out the process according to my invention the material used for the cathode is of great importance. I have found that chromium-nickel alloys, containing for instance 15 per cent of chromium and 85 per cent of nickel, preferably obtained by melting in vacuo, may be most advantageously used for making cathodes, the chromium-nickel cathodes being sufficiently durable and cheap and showing little hypertension. Chromium-nickel alloys containing a small percentage of other metals are also adapted for the purpose in question. Also pure chromium or another metal well plated with chromium have proved successful.

As to the distillation of the persulfate solutions containing sulfuric acid, we know that it is very difficult to carry through the distillation of solutions not absolutely free from catalysts, owing to the fact that in this case decompositions take place during the distillation, whereby the output is considerably decreased. This inconvenience makes its influence felt the more the greater the quantities are which are to be treated. Now I have found that solutions of this kind although they are not at all free from catalysts can be distilled with good results by carrying out the distillation in tubes in the following manner:—

The solution is aspirated from below into a sufficiently narrow, vertical or inclined tube (or a system of tubes) heated from without and communicating at its top end with a vacuum pump. A pressure of 20 to 40 millimeters, for instance, gives good results. The liquid rises to the top commingled with and whirled up by vapor. While the collected vapor consisting of steam and hydrogen peroxide is passed to the condenser, the residue flows off at the top. The method described thus allows of obtaining the hydrogen peroxide with satisfactory output from the solutions coming from the electrolysis even if they contain catalytic matter. In the same manner the peroxide may, of course, be distilled from solutions obtained in another way. Another in itself well-known method consists in letting the solutions flow along the walls of the tube from top to bottom; but the first-mentioned method is to be preferred.

Finally another modification of my process consists in pouring the solutions to be distilled upon heated moving surfaces. For this purpose known devices may be employed as, for instance, rotary tubes heated from without or drying-drums or the like.

For constructing the tubular distilling apparatus, I may use, for instance, ceramic material which up-to-date almost exclusively came into consideration, especially as far as substances were to be distilled from acid solutions. Tantalum has also been proposed for the purpose in question. As for the rest, one had hitherto believed that heavy metals were impracticable for this purpose owing to the catalytic decomposition of the active oxygen brought about by the contact of the metals with the peroxidized solutions.

Now I have found that distilling apparatus of the kind described may be made of heavy metals provided they are chemically resistant against the solutions here coming into consideration. Of course, when using a metal or metals for constructing the apparatus for carrying out the herein described process, the apparatus may be constructed so as to be by far better adapted for the thermical and chemical conditions than by using, for instance, ceramic material, and furthermore essential advantages as to practical working are obtained. As constructing material especially the precious metals and their substitutes are suitable, for instance silicon-iron alloys. These metals or alloys have proved to be serviceable under the conditions here coming into consideration, just as well as they have proved to be serviceable in the manufacture of sulfuric acid, but also chromium-nickel steel having the composition of the well-known V2A steel has proved to be adapted for the purpose. In this case, it is true, the contents of active oxygen in the solution under treatment must not fall below a certain value, the limit being, for instance, 0.1 to 0.05 p. ct. with different sorts of alloys. Still more advantageous is the use of pure chromium-nickel alloys produced according to the well-known method by melting in vacuo. These alloys are to a sufficient degree, even in absence of active oxygen, difficultly soluble in the solutions coming into contact with them. Even a small percentage of iron or other metal does not render the before-mentioned alloys useless for the purpose in question.

The apparatus required for carrying out my process may be heated with steam, hot liquids, waste combustion gases or the like and the heating may be effected from without or within. Internal heating may, for instance be effected by means of a pipe surrounded by the solution, the said pipe shutting off the evacuated distilling space and the heated medium flowing through its interior.

It is also possible to realize an electric heating by means of the above-mentioned metals in spite of their catalytic action on active oxygen; the walls of the distilling vessel or helixes or sheet metal lying in the liquid or the like may form the heating resistances in this case.

When distilling out of pipes I have found it essential to convey the liquid to the several distilling apparatus uniformly. This is especially important and, at the same time, difficult when using a great number of tubes or other distilling elements, however a uniform supply is easily obtainable by using capilliary tubes and placing the same in front of the several apparatus so that the liquid is directly drawn in through the said capilliary tubes by the action of the vacuum. Should the pressure be subjected to variations the supply through a capillary tube having a length a several centimeters nevertheless remains practically constant. Thus, for instance, by employing a capillary an increase of the distilling output of about 15 p. ct. was attained as compared with the output attained by controlling the supply by means of a cock. As well as the above mentioned products, also metals coated with chromium are adapted for the same purpose.

A further considerable improvement is attained by introducing water into the solution at one or more points during the distillation. This may be explained by the fact that towards the end of the distillation the temperature and therewith the decomposition is considerably increased in consequence of the increased concentration, whereas by adding a relatively small amount of water the concentration and the temperature are kept within the critical limits.

Referring now to the drawing which shows an apparatus for distilling neutral hydrogen peroxide solutions, the $H_2O_2$ yielding solution to be distilled may be contained in a bowl $a$. The solution is sucked up through a capillary pipe $b$ into a tube $c$ surrounded, for instance, by a heating jacket $d$. The tube $c$ is connected at its top end with a receiver $e$ having two tubulures $f$, $g$, one of which ($f$) communicates with the vacuum pump, the other ($g$) being arranged to carry off the residue from the distillation. Arrow $h$ indicates the way of the vapors, and arrow $i$ the way of the residue from the distillation.

I claim:—

1. The process of producing hydrogen peroxide from a solution, yielding hydrogen peroxide on heating, in a vertical externally heated distilling chamber having a capillary tube mounted in a receptacle containing the solution to be distilled and extending upwardly into the bottom of the said chamber, the latter having a branched offtake pipe connected to vacuum means, comprising drawing the said solution up through the capillary tube into the chamber wherein it is subjected to the heat of the chamber and distilled, drawing off the evolved vapors and residual at the top of the tube by the suction applied thereto, and separately collecting the hydrogen peroxide from the residual.

2. The process of producing hydrogen peroxide from a solution, yielding hydrogen peroxide on heating, in a vertical externally heated distilling chamber having a capillary tube mounted in a receptacle containing the solution to be distilled and extending upwardly into the bottom of the said chamber, the latter having a branched offtake pipe connected to vacuum means, and the parts to be exposed to the solution and its vapors being made of non-rusting steel, comprising drawing the said solution up through the capillary tube into the chamber wherein it is subjected to the heat of the chamber and distilled, drawing off the evolved vapors and residual at the top of the tube by the suction applied thereto, the percentage of active oxygen in the solution being kept above 0.05 per cent, and separately collecting the hydrogen peroxide from the residual.

3. The process of producing hydrogen peroxide from a solution, yielding hydrogen peroxide on heating, in a vertical externally heated distilling chamber having a branched offtake pipe connected to vacuum means, comprising sucking the solution into the distilling chamber from its bottom, and separately withdrawing the vapors and the residual at its top.

4. The process of producing hydrogen peroxide from a solution, yielding hydrogen peroxide on heating, in a vertical externally heated distilling chamber having a branched offtake pipe connected to vacuum means, the parts to be exposed to the solution and its vapors being made of non-rusting steel; comprising sucking the solution into the distilling chamber from its bottom, the percentage of active oxygen in the solution being kept above 0.05 per cent, and separately withdrawing the vapors and the residual at its top.

5. The process of producing hydrogen peroxide from a solution, yielding hydrogen peroxide on heating, in a vertical externally heated distilling chamber having a branched offtake pipe connected to vacuum means, comprising sucking the solution in the form of capillary jets, into the distilling chamber from its bottom, and separately withdrawing the vapors and the residual at its top.

6. The process of producing hydrogen peroxide from an acidulated persulfate solution in a vertical externally heated distilling chamber having a branched offtake pipe connected to vacuum means, comprising sucking the solution into the distilling chamber from its bottom, and withdrawing the vapors and the residual at its top.

7. The process of producing hydrogen peroxide from an acidulated persulfate solution in a vertical externally heated distilling chamber having a branched offtake pipe connected to vacuum means, comprising sucking the solution in the form of capillary jets, into the distilling chamber from its bottom, and separately withdrawing the vapors and the residual at its top.

8. The process of producing hydrogen peroxide from a solution, yielding hydrogen peroxide in heating, in an externally heated distilling chamber having a capillary tube mounted in a receptacle containing the solution to be distilled and extending upwardly into the bottom of the said chamber, the latter having a branched offtake pipe connected to vacuum means, comprising drawing the said solution in an ascending column up through the capillary tube into the chamber wherein it is subjected to the heat of the chamber and distilled. drawing off the evolved vapors and residual at the top of the chamber by the suction applied thereto, and separately collecting the hydrogen peroxide from the residual.

9. The process of producing hydrogen peroxide from a solution, yielding hydrogen peroxide on heating, in an externally heated distilling chamber having a capillary tube mounted in a receptacle containing the solution to be distilled and extending upwardly into the bottom of the said chamber, the latter having a branched offtake pipe connected to vacuum means, and the parts to be exposed to the solution and its vapors being made of non-rusting steel, comprising drawing the said solution in an ascending stream up through the capillary tube into the chamber wherein it is subjected to the heat of the chamber and distilled, drawing off the evolved vapors and residual at the top of the chamber by the suction applied thereto, the percentage of active oxygen in the solution being kept above 0.1 per cent, and separately collecting the hydrogen peroxide from the residual.

10. The process of producing hydrogen peroxide from a solution, yielding hydrogen peroxide on heating, in an externally heated distilling chamber having a branched offtake connected to vacuum means, comprising sucking the solution in an ascending column into the distilling chamber from its bottom, and separately withdrawing the vapors and the residual at its top.

11. The process of producing hydrogen peroxide from a solution, yielding hydrogen peroxide on heating, in an externally heated distilling chamber having a branched offtake pipe connected to vacuum means, the parts to be exposed to the solution in an ascending column and its vapors being made of non-rusting steel; comprising sucking the solution into the distilling chamber from its bottom, the percentage of active oxygen in the solution being kept above 0.05 per cent, and separately withdrawing the vapors and the residual at its top.

12. The process of producing hydrogen peroxide from a solution, yielding hydrogen peroxide on heating, in an ascending externally heated distilling chamber having a branched offtake connected to vacuum means, comprising sucking the solution in the form of capillary jets, into the distilling chamber from its bottom, and separately withdrawing the vapors and the residual at its top.

13. The process of producing hydrogen peroxide from an acidulated persulfate solution in an externally heated distilling chamber having a branched offtake pipe connected to vacuum means, comprising sucking the solution in an ascending stream into the distilling chamber from its bottom, and withdrawing the vapors and the residual at its top.

14. The process of producing hydrogen peroxide from an acidulated persulfate solution in an externally heated distilling chamber having a branched offtake pipe connected to vacuum means, comprising sucking the solution in the form of capillary jets, into the distilling chamber from its bottom, and separately withdrawing the vapors and the residual at its top.

In testimony whereof I affix my signature.

LEO LÖWENSTEIN.

CERTIFICATE OF CORRECTION.

Patent No. 1,851,961.   March 29, 1932.

LEO LÖWENSTEIN.

It is hereby certified that the name of the assignee in the above numbered patent was erroneously described and specified as "firm J. D. RIEDEL AKTIEN-GESELLSCHAFT" whereas said name should have been described and specified as firm J. D. RIEDEL - E. de HAËN AKTIENGESELLSCHAFT as shown by the records of assignments in this office; and that the said Letters Patent should be read with this correction therein that the same may conform to the record of the case in the Patent Office.

Signed and sealed this 6th day of September, A. D. 1932.

M. J. Moore,
Acting Commissioner of Patents.

(Seal)